(12) United States Patent
Makowski, Jr. et al.

(10) Patent No.: US 6,859,936 B2
(45) Date of Patent: Feb. 22, 2005

(54) METHOD AND SYSTEM FOR PRODUCING PROGRAM-INTEGRATED COMMERCIALS

(75) Inventors: John L. Makowski, Jr., Ellicott City, MD (US); Stephen C. Intlekofer, Severna Park, MD (US)

(73) Assignee: Denizen LLC, Ellicott City, MD (US)

(*) Notice: Subject to any disclaimer, the term of this patent is extended or adjusted under 35 U.S.C. 154(b) by 222 days.

(21) Appl. No.: 09/989,276

(22) Filed: Nov. 20, 2001

(65) Prior Publication Data

US 2002/0170055 A1 Nov. 14, 2002

Related U.S. Application Data

(60) Provisional application No. 60/290,582, filed on May 11, 2001.

(51) Int. Cl.⁷ .............................. H04N 7/10; H04N 7/025
(52) U.S. Cl. ............................ 725/36; 725/32; 725/35; 725/37; 725/60; 725/34; 348/586; 348/587; 348/598; 348/722
(58) Field of Search .............................. 725/32, 35–37, 725/60; 345/723, 706; 705/10, 14; 386/4; 348/586, 587, 598, 722, 723, 743

(56) References Cited

U.S. PATENT DOCUMENTS

| | | |
|---|---|---|
| 4,724,491 A | 2/1988 | Lambert |
| 5,424,770 A | 6/1995 | Schmelzer et al. |
| 5,589,945 A | 12/1996 | Abecassis |
| 5,600,366 A | 2/1997 | Schulman |
| 5,708,478 A | 1/1998 | Tognazzini |
| 5,715,018 A | 2/1998 | Fasciano et al. |
| 5,760,820 A | 6/1998 | Eda et al. |
| 5,805,974 A | 9/1998 | Hite et al. |
| 5,855,008 A | 12/1998 | Goldhaber et al. |
| 5,917,830 A * | 6/1999 | Chen et al. ................ 370/487 |
| 5,937,329 A | 8/1999 | Helmy et al. |
| 6,002,443 A * | 12/1999 | Iggulden .................... 348/553 |
| 6,049,824 A | 4/2000 | Simonin |
| 6,065,042 A | 5/2000 | Reimer et al. |
| 6,157,814 A | 12/2000 | Hymel et al. |
| 6,177,931 B1 * | 1/2001 | Alexander et al. ......... 345/327 |
| 6,208,387 B1 | 3/2001 | Magnusson et al. |
| 6,226,041 B1 | 5/2001 | Florencio et al. |
| 6,263,505 B1 | 7/2001 | Walker et al. |
| 6,282,713 B1 * | 8/2001 | Kitsukawa et al. .......... 725/36 |
| 2002/0083469 A1 * | 6/2002 | Jeannin et al. ............. 725/135 |

OTHER PUBLICATIONS

Webster's II New Riverside University Dictionary, Riverside Publishing Company, p. 904.*
R.D. Heldenfels, "Chance of missing TV ads getting remote," The Baltimore Sun, Apr. 22, 2001.

* cited by examiner

*Primary Examiner*—Chris Grant
*Assistant Examiner*—Ngoc Vu
(74) *Attorney, Agent, or Firm*—Richard C. Weinblatt; Eric A. Dichter; Wolf, Block, Schorr and Solis-Cohen LLP

(57) ABSTRACT

A method and system for incorporating thematic content from a particular television program into product or service advertisements uses program-advancing elements of a television program in an advertisement for a sponsor of the program in order to entice viewers to watch the advertisements. Increased viewership of advertisements can result in increased revenue generated from advertisements that may be realized by television programs, television producers, networks, and advertisers.

24 Claims, 1 Drawing Sheet

METHOD AND SYSTEM FOR PRODUCING PROGRAM-INTEGRATED COMMERCIALS

CROSS-REFERENCE TO RELATED APPLICATION

This application claims the benefit of U.S. Provisional Application No. 60/290,582, filed May 11, 2001, the entire disclosure of which is incorporated herein by reference in its entirety.

FIELD OF THE INVENTION

The present invention is directed to specialized commercial advertising. More particularly, the present invention relates to a method and system for incorporating thematic content from a television program or other dramatic work into product or service advertisements.

BACKGROUND OF THE INVENTION

Television networks sell advertising during television programs and generally receive revenue for use of the commercial airtime in proportion to the program's viewership, i.e., ratings. As such, networks face the problem of viewers not watching the commercials in between segments of the television program. This is especially troublesome with the prevalent use of remote controls allowing a viewer to change channels without moving and the use of videocassette recorders that allow viewers to watch programs at different times than they are shown on the networks (i.e., time shifting). In addition, TiVo®-type devices which allow time shifting of programs on a real-time basis can diminish the amount of commercials watched by viewers.

Advertisers have tried to hype their commercials, for example, for new product releases, before they are going to be shown during a television event like the Super Bowl, the Oscars, etc. Also, advertisers have utilized actors from television commercials (e.g., Jerry Seinfeld of the "Seinfeld" program in American Express® commercials, Jason Alexander in Rold Gold® (a registered trademark of Frito-Lay) pretzel commercials, or the Costanzas from the "Seinfeld" program acting in character in an MCI commercial, but never has an actor appeared in character in a commercial in a context through which the thematic content of a program is advanced. In the old days of television, an actor might even break away from a television program to advertise a product (e.g., the program "I Love Lucy®" with toothpaste), but these types of commercial breaks are no longer used. A need now exists for a method of enticing viewers to remain tuned not only to a specific program but also throughout the entirety of each of that program's commercial breaks. This will provide monetary benefit to networks and a consistent viewership for advertisers.

The viewer tendency of wandering off from his/her original program of interest during a commercial break and never returning has become a major concern of television networks. The sheer volume of programs to choose from on a cable or satellite system has caused viewers to end up only watching about a fraction of, on average, three to four different shows, switching to a new program at the onset of a commercial break.

Viewers' ability to ignore commercials has caused television to move closer to nonstop advertising through product placements in shows, onscreen crawls, and the use of promotional logos in the middle of programs. Even informational content can serve as an advertisement, such as ESPN's "bottom line" on-screen display of sports scores and information which also includes advertising for programs, related channels and products (e.g., one such advertisement urges people to buy their NFL Draft gear from a web site).

The cable channel, Oxygen™, has taken that bottom-line approach a step further by positioning an information line at the bottom of programming and commercials, supplementing advertisements with an additional slogan line, the product's telephone number, or its Internet address.

In addition, during a prime-time program, NBC has inserted a graphic promoting its new series "Weakest Link." Also, MTV™ runs countdowns to a big event during other programs, such as its annual music awards. Further, during baseball telecasts, the picture is reduced so that half of the screen can be used to remind viewers that there are tickets available for upcoming games.

Another approach has put products in program names, such as "Kraft Premier Movie" telecast of a new version of "Murder on the Orient Express." More subtle tactics include the use of sponsors' products within programs, such as when a player on "Survivor: The Australian Outback" pined for Doritos®, or the department store Target sponsoring items distributed to the contestants.

There have also been similar corporate tie-ins to programs, such as Disney World becoming a location for episodes of shows on Disney-owned ABC.

As indicated above, several factors have caused television to create the constant commercial. One of the reasons for the introduction of such factors is that the load of traditional advertisements has steadily grown over the years. While the amount varies from show-to-show, generally 25 to 30 percent of commercial-TV viewing is for advertising.

The constant logos for stations and networks in the corner of TV screens tell zap-happy viewers where they are to help Nielsen headcounters track ratings. On-screen weather maps and news crawls that do not completely interrupt the programs are a way to keep viewers informed without waiting for a commercial break when they may be channel hopping. Also, the maps and crawls serve a secondary purpose of promoting an upcoming newscast.

Various technology has been used to ease the insertion of advertisements in between program segments, such as using automatic computer control into cable or satellite broadcasts. Also, advertisements have been customized for the individual viewer. In addition, techniques such as "road block advertising" have been used to run the same advertisement on different networks simultaneously. Further, satellite viewers may receive broadcast advertisements from the local areas, rather than nationwide advertisements by a system that selectively transmits such advertisements to satellite viewers in certain areas.

Many of the techniques of inserting advertising or logos into programs prove offensive to viewers which may turn them off to programs and reduce viewership and corresponding advertising revenue. Accordingly, there is a need for a method and system to ensure that television program viewers will watch programs and corresponding advertisements.

SUMMARY OF THE INVENTION

The present invention comprises a method and system for incorporating thematic content from a particular television program into product or service advertisements (commercials) for a sponsor of the program or network. The present invention also comprises a method and system for increasing the viewership of television programs and advertisements by incorporating such thematic content into product or service advertisements.

In one embodiment of the invention, the commercial incorporates program-advancing elements of the program, such as characters, objects, sounds, settings, dialogue relating to a program theme, and any other aspect of a program that can be recognized in an advertisement. The commercial containing thematic content may be shown during the time the program airs live on the network, during a reairing of that program, during another program, and/or in another medium.

The method and system of the present invention can be computer-implemented, such as with production equipment and in an automated fashion using computer software. The equipment and/or software recognizes the product/service-related content of an advertisement and inserts a program's thematic content into the advertisement. In some instances, the inserted thematic content may be computer-generated, obviating the need to film such content. Alternatively, the production equipment allows for the filming of the product advertisement along with characters and/or other elements of a television program in the advertisement.

It is to be understood that both the foregoing general description and the following detailed description are exemplary, but are not restrictive, of the invention.

BRIEF DESCRIPTION OF THE DRAWINGS

The following detailed description of the invention will be better understood when read in conjunction with the appended drawings. It should be understood, however, that the invention is not limited to the precise arrangement shown.

DETAILED DESCRIPTION OF THE INVENTION

Figure 1:
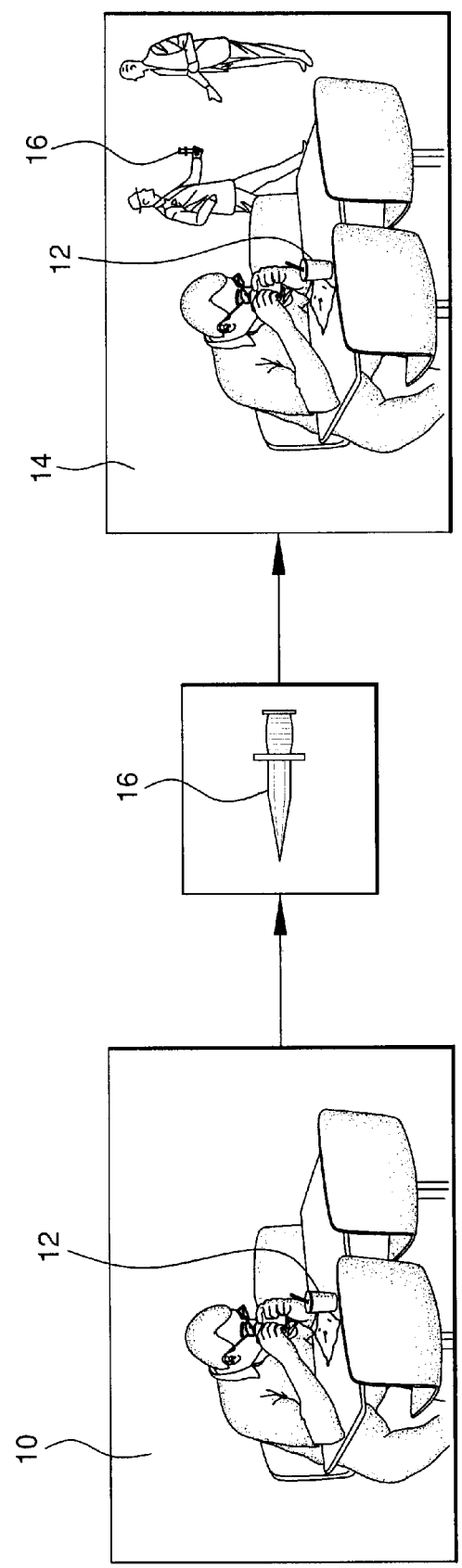
FIG. 1 is a diagram of the method and system of the present invention.

The present invention comprises a method and system for incorporating thematic content (audio and/or video) from a particular television program into the content of product or service advertisements, i.e., audio and/or video about the product or service. The television program may be one from a non-pay network, a cable network, a satellite network, or a program broadcast through any alternative medium, including, but not limited to, computer networks, such as the Internet. The thematic content comprises program-advancing elements of the program, such as characters, objects, sounds, settings, dialogue relating to a program theme, any other element capable of being recognized, or any combination of such elements. The program-advancing elements are capable of being recognized by their association with a program and/or by their association with other program-advancing elements, even if the program-advancing element was not previously included in the program. The program-integrated commercial comprises audio and video containing elements of the program along with audio and video which advertises a product or service.

A program-advancing element is anything that promotes a program, and/or supplements or uses some existing element of the program to impact any aspect of the program, e.g., the story line. A program-advancing element is a plot-advancing element if it impacts the program and/or a program-promoting element if it promotes the program. The program-advancing element is specific to a program or is associated with a program element such that it is capable of being recognized by a viewer. This includes, but is not limited to, character actions, setting description, objects, sound recognition, and character dialogue, etc.

In one embodiment, as shown in FIG. 1, a conventional advertisement 10 shown during television program's commercial break promotes a new product 12 of, for example, a fast-food establishment. The advertisement 10 is attempting to sell the particular product 12. A program-advancing element 16, such as the knife in this particular example, is introduced into the advertisement 10 to form a program-integrated advertisement 14. The program-advancing element relates to the television program and can be a program-promoting element, i.e., a viewer associates the knife with the program. Additionally, the two characters dealing with the knife in the program-integrated advertisement 14 may themselves be program-advancing elements, if they are characters in the program.

The mere appearance of a program element in a product/service commercial promotes the program and bestows upon that element a magnified significance in relation to the otherwise intact plot line of the given show; such program element is considered program-advancing even if its appearance does not directly contribute to the program's plot. The presence of the program element, i.e., program-advancing element, causes the advertisement and program to be inextricably linked, as shown in FIG. 1

Generally, the program-integrated commercials of the present invention air during or adjacent to the time slot of the television program. More specifically, the program-integrated commercials are broadcast in between segments of the program, or directly before or after the time slot during which the program is broadcast.

Program-advancing elements according to the present invention are distinguishable from a program's characters (or objects, sounds, settings, dialogue relating to a program theme, etc. to the extent they may have been broadcast previously) featured in commercials previously broadcast (such as the Costanzas from the program "Seinfeld" in an MCI long distance telephone service commercial or Bart Simpson from the program "The SimpsonsTM" in a Butterfinger®candy bar commercial) by the effect on or the message conveyed by the product or service commercial. If the message conveyed by a commercial containing a character (or other program element) is at least dual, i.e., (1) it attempts to sell the product or service being advertised, and (2) it attempts to advance the plot of the program and/or promote the program, the character usage is a program-advancing element according to the present invention.

In contrast, when the message conveyed by a commercial containing a character (or other program element) is singularly to sell the product or service being advertised, that element is not a program-advancing element according to the present invention. The character(s) used in the commercial may be increasing a viewer's recollection of that commercial. For example, in the MCI/Costanzas and Butterfinger®/Bart Simpson commercials, the message conveyed by that commercial is to promote the product or service being advertised by increasing viewers' recollection of the product/service by associating the product and service with well-known program characters. The message conveyed by the MCI and Butterfinger® commercials' characters does not advance the plot of or promote their respective programs and, accordingly, the MCI and Butterfinger® commercials described above would not be considered program-integrated commercials of the present invention.

A feature of the invention is the obvious or subtle association of a television program with any particular product or service commercial due to the appearance, in the commercial, of any program-advancing element from the television program. The program-advancing element may be a character from the program acting consistent with the way in which that character acts on the program, or any non-character item, such as an object, sound, or setting from the program portrayed in a different light. In addition, a program-advancing element can be an element not previously featured on a program, but which is recognizable based on its association with an existing program element in a program-integrated commercial according to the present invention. For example, if a character from a program is featured in a program-integrated commercial with an object never before seen on the program, that object becomes a program-advancing element by its association with that character. The program-integrated commercial may include part of the program's story line that a viewer would need to watch to obtain full enjoyment of the program.

Furthermore, the invention uses a recognizable element from a program, which can appear in a commercial in any form The program and commercial are associated by time of placement (i.e., programs and commercials in an hour of television time) or by simply being played on the same network. The program element can be a replica of one used in the program or a computer-generated image.

If a sponsor would like to make a program-integrated commercial of the present invention that is not confined to a particular show or network, so that it is capable of being played on any network at any time, a "clean" and a "dirty" version of any given commercial can be made. The "clean" version has no program-advancing elements, and can thus be played on any network at any time. The "dirty" commercial contains program-advancing elements. Computer software can be used to add or remove such program-advancing elements. With the present state of computer technology, the cost of adding or removing such program-advancing elements would be negligible.

The present invention will diminish the tendency to "channel surf" during commercial time between different programs or segments of a program. Program-integrated commercials of the present invention will aid in keeping viewers tuned to the network without the possibility of developing an interest elsewhere or on another network or cable channel. With the multitude of cable channels to choose from today and some of them not breaking for commercials at all, the odds of a viewer returning to the original program of interest are rapidly decreasing. Program-integrated commercials will combat the fickle or disloyal television viewer mentality.

The present invention may be able to remedy an advertiser's inability to retain an advertising slot after the initial airing of the particular episode of a program. With the program-integrated commercial, an advertiser might be able to retain an advertising spot even when the program airs again as a rerun on the same network or during syndication years later, possibly on a different network; such advertisement may be the original commercial or a new, updated commercial, although incorporating the same program content.

The program-integrated commercials of the present invention include, but are not limited to, the following types of items: (1) cameo appearances of characters from a program acting in character in a way which relates to the story line (e.g., Cancer Man from "The X-Files" or any supporting actors from a particular program); (2) an actual appearance of portions of a program in a commercial (e.g., a television set playing the program in the background of a commercial); (3) sweepstakes utilizing a search for a character in a Where's Waldo? vein, in which the commercial may be interactive (e.g., over the Internet), an instant results sweepstakes which could utilize programs targeted to teenagers (e.g., the WB network, "Saved by the Bell" program, etc.), and/or young kids (e.g., Saturday morning cartoons or other shows); (4) foreshadowing of a program's future plot line, such as with a mystery (e.g., "The X-Files" notebook found in a commercial having mystery clues) or hype for a program in a new season or new program (e.g., in the "Felicity" program, missing character (Noel) is seen in a commercial before his character is found on the program to give an indication of where he may or may not be found during the program); (5) expansion of a program's plot line, where actual events take place in the commercials that did not take place in the program (e.g., the passing of a knife from one villain to another in the back of a Wendy's® commercial, similar to the passing of the knife in FIG. 1); (6) sound bytes both on and off camera (e.g., "Seinfeld's" George and Elaine acting in character and arguing during a commercial); (7) an Internet site to access information on a program or contest (e.g., a connection to a "Seinfeld" site where contestants compete in real time); and/or (8) streaming audio and video on an Internet web site having program elements in advertisements.

Incorporation of a theme into a commercial can be used subtly, for example, as part of the commercial language. Specifically, program-advancing elements can be incorporated into advertisements by filming such elements while the advertising content is being filmed; by inserting such elements, taken from the program and/or filmed separately, into an existing advertisement by various television editing techniques known in the art; by computer manipulation of such elements and the advertising content; or any combination of these techniques.

The program-integrated commercial can be shown at a specific (or confined) time for viewing. In addition, the commercial can be intermittently shown to reinforce behavior. In an exemplary embodiment, about two (or other appropriate number between about 1 and 10 depending on the program) minutes of the program's time can be reserved for program-integrated commercials.

Advertisements incorporating thematic content can be broadcast in various media, including, but not limited to, television, radio, Internet, videos, and print advertising. In addition, the present invention also includes using program-integrated commercials from a broadcast medium other than non-pay television, cable, and satellite network, such as computer networks (e.g., the Internet), or any other medium that can broadcast programs.

The method of the present invention can help to ensure that viewers watch commercials during breaks in the program being watched, which is virtually unprecedented; this can increase the revenue television networks collect for advertising and increase the public exposure that an advertiser's product or service receives.

Further, one example of handling the issue of airtime and syndication is for companies who run advertising containing program elements to purchase show time. In other words, about two (or other appropriate number between about 1 and 10 depending on the program) minutes of actual showtime would be sold, on top of the regular commercial slots. This would be a premium cost slot because of the memory factor (the audience would associate the program-advancing element with the name of the company) and about 3 or 4 commercials could be sold for each 2-minute slot.

Production equipment allows for the creation of advertising content and thematic content from a program and insertion/incorporation into a program-integrated commercial. The method and system of the present invention may be computer-implemented such that computer software controlling production equipment allows for the development of advertisements containing program-advancing elements from a program. The software monitors the content of the advertisement; alternatively, the software can create the content of the advertisement. The software controls the insertion of the audio and video feed, which comprise the thematic content from a program, into an advertisement; additionally, the software may generate the audio and video feed prior to insertion. The computer-implemented method and system allow for precise matching of advertisements with thematic content so as to achieve the highest viewership.

The following examples help to illustrate the present invention.

EXAMPLE 1

An example of the method and system of the present invention utilizes a television program of "The Prisoner." In the program, the character who is the prisoner on an island is pictured in a scene along with a woman wearing an orange dress who is a resident of the island and a nemesis of the prisoner. In a product advertisement for Canadian fiberglass insulation airing in between segments of the program, the woman in the orange dress is placed in a scene of the advertisement, standing in front of a specific house. The woman in the orange dress comprises a program-advancing element because the advertisement provides an indication of the activities and location of the woman in the orange dress which advances the program's plot. Viewers are more likely to watch this type of advertisement for aspects of "The Prisoner" program.

EXAMPLE 2

In another example of the present invention, a character in the program finds a notebook with some cryptic writing in it, and it becomes a key element in the program. That notebook, acting as a program-advancing element, could turn up during the commercial break, for example, in a Wendy's® commercial being read by a patron at a table as the camera passes. As such, the program-integrated commercial can be simple and non-intrusive in inserting elements of the program into the commercials.

EXAMPLE 3

In yet another example of the present invention, two shady-looking characters enter the story line of a particular television program at different times and are not yet known to have any connection to one another. In an automobile commercial, the same two characters appear in the background conversing in a conspiratorial manner. This apparent conspiracy advances the plot by portraying the shady-looking characters in a new light. The characters and apparent conspiracy are action as program-advancing elements. This is in contrast to the use of well-known characters from a television program acting in character in a commercial, such as the Costanzas in the MCI commercial, to hype the product/service being advertised. In the example of the present invention, the characters are used to advance the program's plot and to promote the program; in conventional commercials, such as the MCI commercial described above, the recognition of that the program's characters provides an association which helps to sell the product/service.

EXAMPLE 4

In still another example of the present invention, foreshadowing can be used. A grandfather clock, acting as a program-advancing element, appears in a Coke commercial in a conspicuous manner. In a later episode of a program of which Coke is a sponsor, that same grandfather clock appears as a prominent clue in a murder ease. Again, the initial Coke commercial advanced the plot of the program by providing foreshadowing to a particular object that later becomes relevant to the program.

EXAMPLE 5

In a further example of the present invention, Cancer Man from the program "The X-Files" appears in the back of a crowd holding an important folder during a Pepsi commercial. Cancer Man holding the folder is acting as a program-advancing element. If Cancer Man appeared in the commercial without the folder or any reference to the plot line, lie would still be acting as a program-advancing element because of the increased focus on his character caused by the commercial and the message conveyed by such a commercial would be dual; the commercial would be promoting sales of the product being advertised, and advancing the plot of and/or promoting the program.

EXAMPLE 6

In an example of a program-advancing element comprising sound recognition or dialogue relating to a program theme, characters sitting around the table in a Kraft® Macaroni and Cheese commercial make reference to a particular character's plight in the program "The Practice."

EXAMPLE 7

In an another example of a program-advancing element comprising sound recognition or dialogue relating to a program theme, an intercom of a Wendy's® in a Wendy's® fast food restaurant commercial broadcasts the voice of a character from the program "The West Wing." mentioning a detail or clue relating to the program.

In Examples 1–7. the program-advancing elements may also be considered program-promoting elements because the appearance of the elements promotes the program.

Although illustrated and described above with reference to certain specific embodiments, the present invention is nevertheless not intended to be limited to the details shown. Rather, the present invention is directed to a method and system of incorporating the thematic content of television programs into commercials, and various modifications may be made in the details within the scope arid range of equivalents of the description and without departing from the spirit of the invention.

What is claimed is:

1. A method of producing an advertisement with thematic content from a television program, comprising:
    incorporating thematic content comprising a plot advancing element of a television program into a product or service advertisement to form a program-integrated product or service advertisement, wherein the program-integrated product or service advertisement is broadcast in between segments of the television program, before a time slot of the television program or after the time slot of the television program, wherein the plot advancing element promotes the plan or pattern of events or the main story of the television program.

2. The method of claim 1 wherein the plot advancing element is at least one member selected from the group consisting of characters, objects, sounds, settings, and dialogue relating to a program theme.

3. The method of claim 1 wherein the plot advancing element is a character from the television program.

4. The method of claim 1 wherein the incorporation step is computer-implemented.

5. The method of claim 4 wherein the computer-implementation is performed with computer software.

6. The method of claim 1 wherein the advertisement is broadcast in at least one medium selected from the group consisting of television, radio, Internet, and videos.

7. The method of claim 1 wherein the program-integrated product or service advertisement is broadcast during or adjacent to the time slot of the television program.

8. The method of claim 1 wherein the plot advancing element is selected from the group consisting of a cameo appearance of a character from a program, a portion of a program, an item foreshadowing the plot of a program, an item expanding the plot of a program, language from a program, and a character from a program.

9. The method of claim 1 wherein the plot advancing element is a program-promoting element.

10. A method for inserting thematic content from a television program into an advertisement, comprising incorporating thematic content from a television program into a product or service advertisement to form a program-integrated product or service advertisement, wherein the thematic content is plot-advancing content, the plot-advancing content promoting the plan or pattern of events or the main story of the television program.

11. The method of claim 10 wherein the plot-advancing content is at least one member selected from the group consisting of characters, objects, sounds, settings, and dialogue relating to a program theme.

12. The method of claim 10 wherein the incorporation step is computer-implemented.

13. The method of claim 12 wherein the computer-implementation is performed with computer software.

14. The method of claim 10 wherein the advertisement is broadcast in at least one medium selected from the group consisting of television, radio, Internet, and videos.

15. The method of claim 10 wherein the program-integrated product or service advertisement is broadcast during or adjacent to the time slot of the television program.

16. The method of claim 10 wherein the plot-advancing content is a program-promoting element.

17. A method of increasing viewership of a television program, a product or service advertisement, or both, comprising:

incorporating a plot-advancing element of the television program into a product or service advertisement to form a program-integrated product or service advertisement, wherein the plot-advancing element promotes the plan or pattern of events or the main story of the television program; and broadcasting the program-integrated product or service advertisement in between segments of the television program, before a time slot of the television program or after the time slot of the television program.

18. A method of producing an advertisement with thematic content from a television program, comprising:

generating content for advertising a product or service;

integrating a plot-advancing element from a television program, the plot-advancing element being at least one member selected from the group consisting of characters, objects, sounds, settings, and dialogue relating to a program theme, with the product or service advertisement content to form a program-integrated product or service advertisement, wherein:

the integration step is computer-implemented with computer software;

the advertisement is broadcast in at least one medium selected from the group consisting of television, radio, Internet, and videos;

the program-integrated product or service advertisement is broadcast in between segments of the television program, before a time slot of the television program or after the time slot of the television program; and the plot-advancing element promotes the plan or pattern of events or the main story of the television program.

19. A system for incorporating thematic content from a television program into a program-integrated advertisement, comprising:

plot-advancing thematic content from a television program;

advertising content; and production equipment for combining the advertising content and the thematic content to form a program-integrated advertisement, wherein the program-integrated advertisement is adapted to be broadcast in between segments of the television program, before a time slot of the television program or after the time slot of the television program, and wherein the plot-advancing thematic content promotes the plan or pattern of events or the main story of the television program.

20. The system of claim 19 wherein the plot-advancing thematic content is at least one member selected from the group consisting of characters, objects, sounds, settings, and dialogue relating to a program theme.

21. The system of claim 19 wherein the production equipment for combining the advertising content and the thematic content is computer-implemented.

22. The system of claim 21 further comprising computer software for computer-implementation.

23. The system of claim 19 wherein the advertisement is broadcast in at least one medium selected from the group consisting of television, radio, Internet, and videos.

24. The system of claim 19 wherein the plot-advancing thematic content is selected from the group consisting of a cameo appearance of a character from a program, a portion of a program, an item foreshadowing the plot of a program, an item expanding the plot of a program, language from a program, and a character from a program.

* * * * *